United States Patent [19]
Doughtie et al.

[11] Patent Number: 5,249,083
[45] Date of Patent: Sep. 28, 1993

[54] AUTOMATICALLY CONTROLLED MIRROR

[76] Inventors: Rutledge C. Doughtie, 5255 Tabard Dr., Mobile, Ala. 36693; Jerald L. Sharpe, Sr., 4246 Downey Dr., Mobile, Ala. 36619

[21] Appl. No.: 875,813

[22] Filed: Apr. 30, 1992

[51] Int. Cl.⁵ .......................... G02B 5/08; G02B 7/182
[52] U.S. Cl. .................... 359/843; 359/865; 359/877
[58] Field of Search ............... 359/841, 843, 872, 877, 359/838, 850, 855, 865

[56] References Cited

U.S. PATENT DOCUMENTS

| | | | |
|---|---|---|---|
| 3,868,176 | 2/1975 | Young | 359/841 |
| 4,820,032 | 4/1989 | Thompson, Jr. | 359/843 |
| 5,056,905 | 10/1991 | Jensen | 359/877 |
| 5,085,504 | 2/1992 | Jensen | 359/843 |

*Primary Examiner*—Bruce Y. Arnold
*Assistant Examiner*—David R. Parsons

[57] ABSTRACT

An automatically controlled rear view mirror for a truck tractor-trailer rig is disclosed which utilizes an stranded metal cable running from an encoder box, mounted on the back center of a tractor to the front center of a trailer; whereby as the trailer turns, the angle between the tractor and trailer changes so as to change the length of the stranded metal cable; thereby triggering the encoder box to send digital signals to a control panel which controls the stepper motor located on the mirror assembly, thereby turning the mirror in response to the tractor being turned at an angle relative to the trailer.

4 Claims, 4 Drawing Sheets

AUTOMATICALLY CONTROLLED MIRROR

BACKGROUND OF THE INVENTION

This invention generally relates to the field of rear view mirrors, more particularly, the invention relates to the field of automatically controlled mirrors particularly adapted for use as outside rear view mirrors for large truck-tractor trailers.

Automatic rear view mirror systems have been described in the prior art. Thompson, in U.S. Pat. No. 4,820,032, described an automated angulating mirror controlled through electronics, hydraulics, and pneumatics to view the movements in respect to a trailer pivotally mounted. McKee, in U.S. Pat. No. 4,609,265, described a rear view mirror actuating device for automatically controlling the position of a movable mounted vehicle mirror comprised of a motor controlled by switches, for selectively actuating the motor in response to angular displacement of a trailer with respect to a vehicle. McKee, in U.S. Pat. No. 3,640,608, described an automatically controlled mirror assembly for trucks, or the like, actuated in response to movement of the steering wheel to move to a position providing maximum visibility. Bowler, in U.S. Pat. No. 3,563,639, described a self-tracking mirror device for a tractor-trailer vehicle combination where the angulation of the mirror changed progressively during the course of a turn to provide the vehicle operator with continuous rear vision at and beyond the rear of the trailer. Jensen, in U.S. Pat. No. 5,085,504, uses a configuration consisting of a magnet and a reed switch to detect the position of the steering wheel.

All of the prementioned inventions, and many others, recognize the need for automatically controlling a tractor-trailer driver's rear view mirrors. However, the inventions that use any part of the steering mechanism, including steering wheel, turn signals, tie rods, etc., seem to ignore the fact that many times the driver has to turn his steering wheel in the opposite direction from which he is attempting to turn the rear of his trailer for corrections, thereby making the mirror turn in the opposite direction from which is needed.

However, while automatically controlled rear view mirrors have been described in the prior art, none of the prior art cited herein discloses the unique and inventive features of the present invention.

SUMMARY OF THE INVENTION

The invention relates to a means for automatically rotating the right or left rear view mirror relative to the right or left rear of the trailer as the tractor turns relative to the trailer.

The invention generally consists of a stranded metal cable, which is wound on a spring loaded take up reel, mounted in an encoder box and attached to the back center of the tractor. The stranded metal cable exits from the rear center of the encoder box and is attached to the front center of the trailer. As the angle between the trailer and the tractor changes, the length of the stranded metal cable is increased or decreased, thereby signaling the optical encoder to actuate an electrical stepper motor located on and connected to the mirror assembly at the left and right sides of the tractor, so as to automatically adjust the mirrors. A control panel is mounted in the cab conveniently positioned for the driver of the tractor, in order to provide fine adjustment and optical encoder overide.

It is common practice to position the right rear view mirror so that as the driver looks at the right mirror, his line of reflective sight is directed toward the right rear of the trailer. However, when the tractor and trailer are not aligned on a common central axis, i.e., when the tractor is turned relative to the trailer, this direct line of sight is lost. Since most mirrors are constructed to a width of about five to six inches, the driver should be able to view an area which includes an area slightly forward of the rear of the trailer and slightly behind. When the driver negotiates a right turn, his line of sight is reflected off of the mirror to a point well forward of the rear of the trailer. For a 45 degree right turn, this point of reflection is very near the front of the trailer. For the driver to see the rear, it would be necessary to turn the mirror in a counterclockwise position. It should be understood that there are a considerable number of times when it is important for the driver to have a view of the rear of his vehicle. One such time is when he is backing into a loading or unloading area such as a dock. At this time, the tractor is almost always at some angle relative to the trailer to facilitate the docking maneuver. The backing maneuver must be fairly accurate as to both distance from the dock, and the line of position of the truck-trailer adjacent to the material to be loaded or a particular door at a warehouse for example. This means that at any angle of the tractor to the trailer, the driver must be able to see the rear of the trailer very well so that he may properly position it with respect to a specific location.

DETAILED DESCRIPTION OF THE INVENTION

Figure 1:
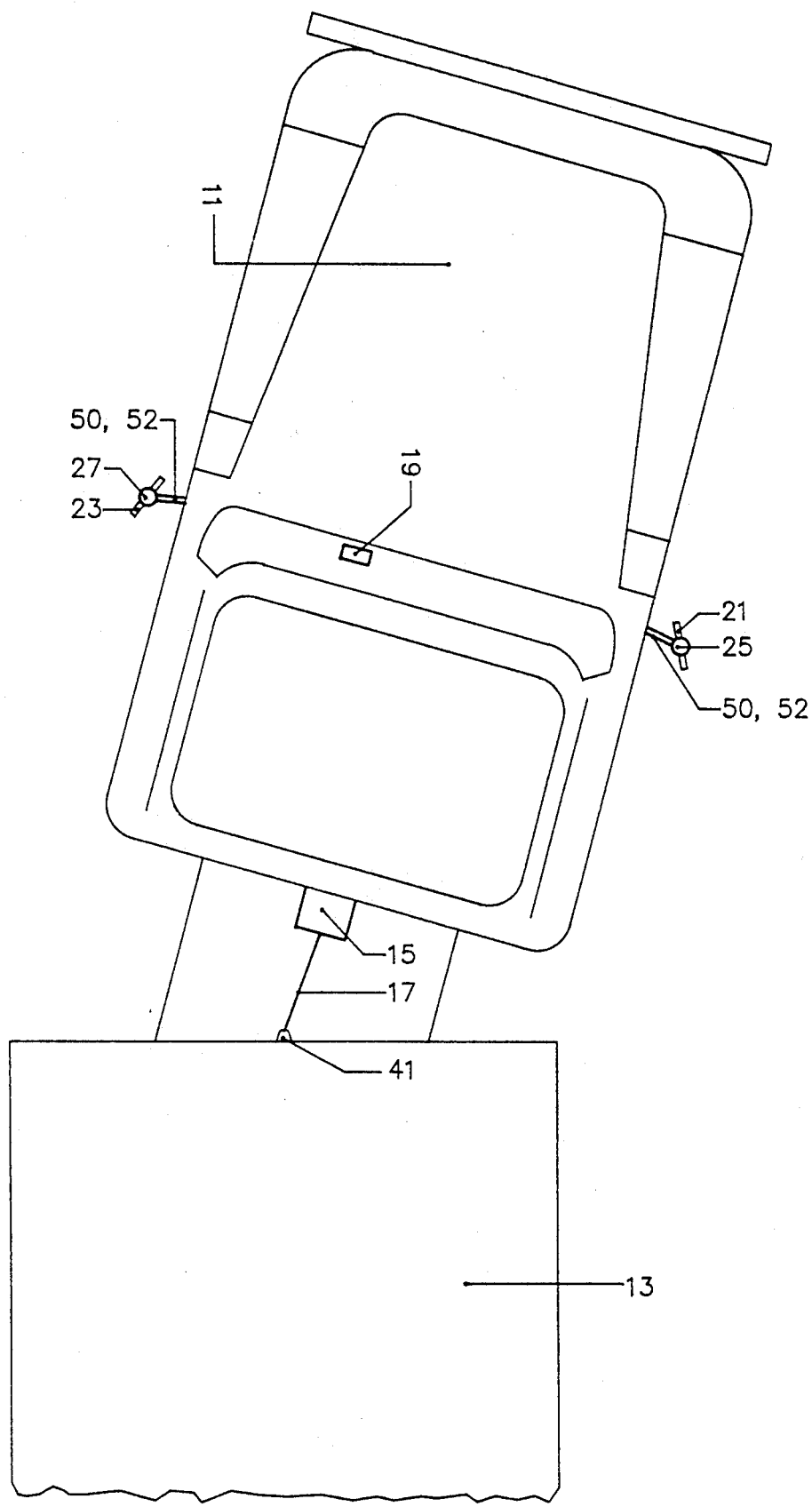
FIG. 1 is a plane view of the present invention shown attached to a tractor-trailer.

In FIG. 1, there is shown a truck's tractor, 11, having connected thereto a trailer, 13. An encoder box, 15, or means for digitally encoding, is attached to the rear of the center of the back of the tractor having a stranded metal cable, 17, running from it to the front center of the trailer, 13. Furthermore, shown in FIG. 1, is a control panel, 19, and a right and left mirror assembly, 21 and 23 respectively, having a right and left stepper motor with gear box, 25 and 27 respectively, attached to the right and left mirrors.

Figure 2:
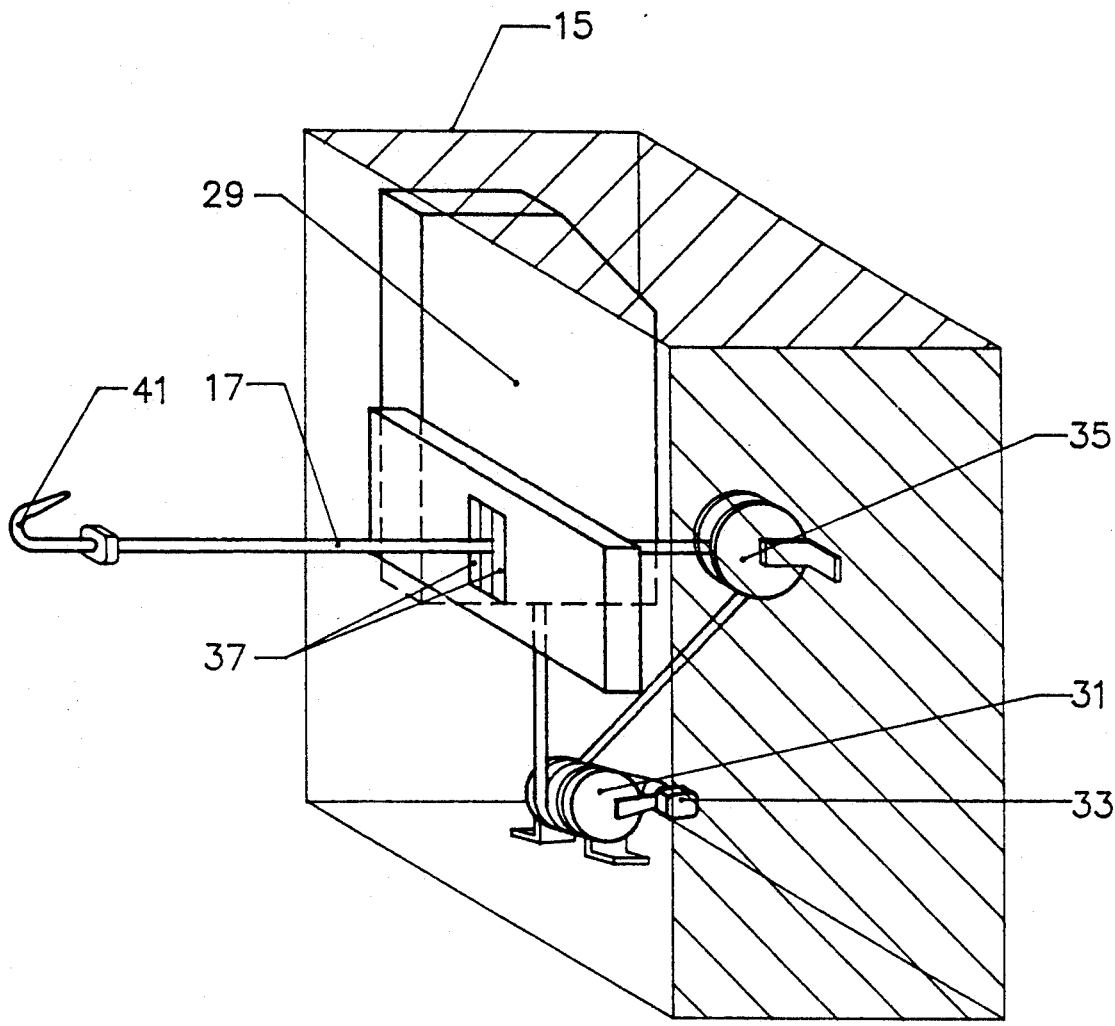
FIG. 2 is a perspective of the encoder box.

In FIG. 2, the detail components of the encoder box, 15, are shown. Attached to the encoder box is a stranded metal cable, 17, with a means, 41, for attachment to the trailer. Furthermore, there is shown a take-up reel, 29, a two layer pulley, 31, with an optical encoder, 33, along with an idler pulley, 35. Furthermore, rollers with micro switches integrally constructed therein are shown at, 37.

Figure 3:
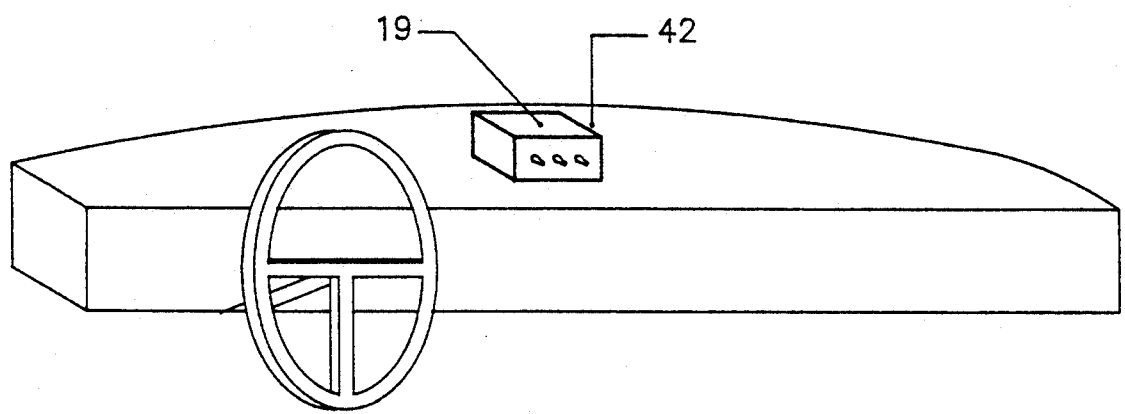
FIG. 3 is a perspective of the control panel of the current invention.

FIG. 3, shows a control panel, 19, having suitable attachment means, 42, for mounting the controller conveniently for the driver of the tractor.

Figure 4:
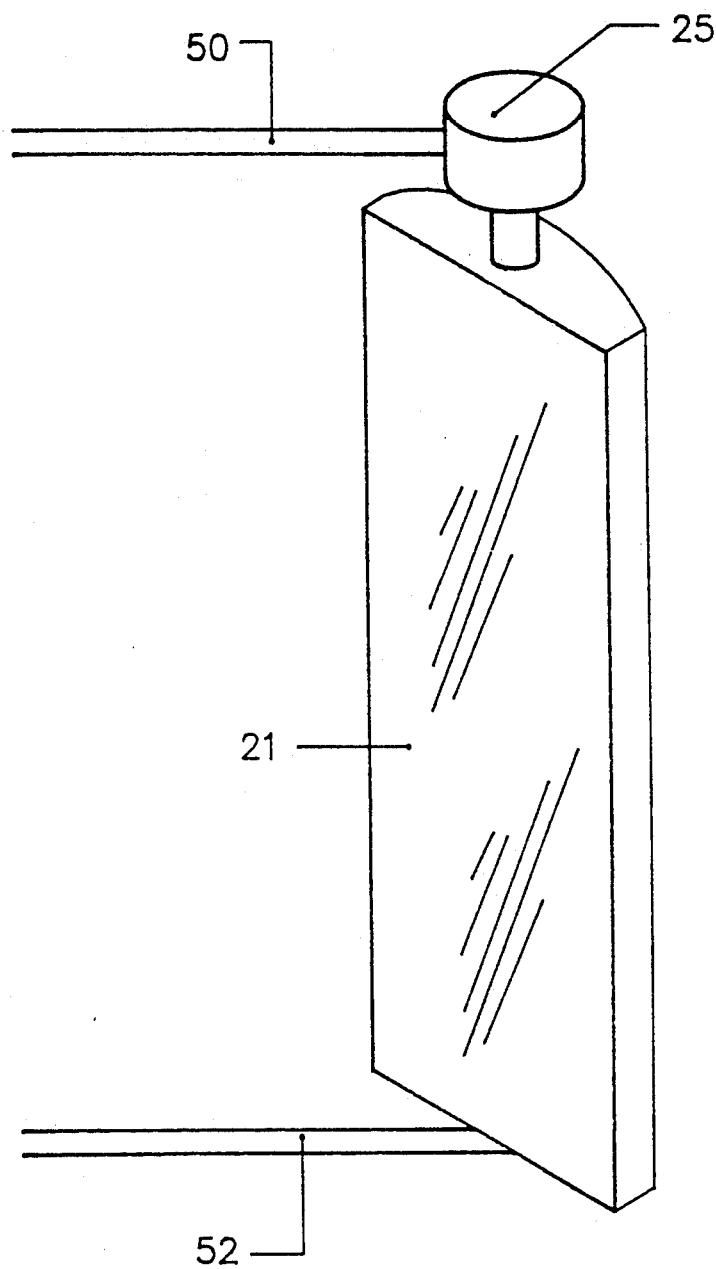
FIG. 4 is a perspective of the outside rear view mirrors with stepper motors attached thereto.

FIG. 4, shows a right side rear view mirror, 21, with a stepper motor with gear box, 25, connected thereto with said mirror having brackets, 50 and 52, for attaching the mirror on or to the side of a truck-tractor.

The system operates in general by having a retractor or take-up reel, being spring loaded, keeping constant tension on a stranded metal cable in order to keep any slack out of it. The stranded metal cable turns a two layer pulley, which drives a belt, which turns an optical encoder. The encoder sends out digital pulses which are directly proportional to the amount of stranded metal cable which is pulled out. As the stranded metal cable exits the encoder box, depending on the direction of pull, it will close one of the micro switches, which will indicate the direction of pull, thus determining which mirror will be rotated. The optical encoder sends out two pulses, which are out of phase with each other. This phase relationship indicates whether the stranded metal cable is moving out or in. These digital signals are sent to a electrical stepper motor controller, which is contained in the control panel, that is mounted in the cab of the truck-tractor. The signals from the optical encoder, routed by the micro switches, are sent to the appropriate stepper motor controller. The mirrors are then turned to track the rear of the trailer. There is also jog left or jog right switch, or the like, for each mirror, for use for fine adjustment and "panning" an area to the rear. When the tractor turns right, only the right mirror turns, and likewise, when the tractor turns left only the left mirror turns. The other mirror, as the case may be, remains in its current position. The stranded metal cable/optical encoder ratio can be changed to accommodate different lengths of trailers.

I claim:

1. An automatic control unit for the coordinated operation of each of two external tractor/trailer mirrors said automatic control unit comprising:

pivoting means for independently pivoting each mirror in response to predetermined control signals;

encoding means for generating and sending said control signals to the pivoting means, said encoding means being responsive to a turning angle of the tractor with respect to the trailer, said encoding means further including;

an optical encoder which cooperates with an extendable cable whereby, during a turning operation, said cable is extended in proportion to the turning angle, with said optical encoder generating control signal pulses in response to the length of the extended cable; and switch means for selectively activating said pivot means in response to the direction of the turn whereby the direction of pull of said extendable cable respectively engages the switch means in order to pivot one of the two mirrors, the device thus providing a constant view of the rear of said trailer at all times while making a turn or backing.

2. A system according to claim 1, wherein both the left and the right mirrors on the tractor are mounted on two brackets, one at the top and one at the bottom of each so as to allow each mirror to swivel, further including a stepper motor affixed to a gear box and wherein the shaft of the gear box is affixed to the top shaft of each mirror.

3. A system according to claim 1, wherein a control panel which is accessible to the driver including an electrical switching means, a jog left and jog right switch for each mirror, which are used for initial adjustment and for panning an area for hazards; wherein the control panel contains stepper motor controllers and also means for overriding the encoder.

4. A system according to claim 1, wherein the encoder means comprises an encoder box and wherein the optical encoder takes analog movements from the extendable cable and converts them to digital signals which correspond to the amount of in or out movement of the extendable cable wherein said pivoting means comprises stepper motors, and said digital signals are fed to stepper motor controllers, which in turn drive the stepper motors; wherein the extendable cable is a spring loaded stranded metal cable extending from a take up reel and is pulled around a pulley including first and second layers; wherein one layer is turned by the movement of the stranded metal cable and on the second layer rides a v-belt which is used to turn the optical encoder and the stranded metal cable is pulled around another pulley and exits the encoder box and is hooked to the center of the front of the trailer; wherein the switch means comprises two micro switches which are located inside the encoder box at the stranded metal cable exit and cooperate with two exit rollers which are moved as the stranded metal cable is forced left or right because of a left or right turn of the tractor and thereby give directions as to which stepper motor to turn.

* * * * *